(12) United States Patent
Egbert et al.

(10) Patent No.: US 7,268,687 B2
(45) Date of Patent: Sep. 11, 2007

(54) RADIO FREQUENCY IDENTIFICATION TAGS WITH COMPENSATING ELEMENTS

(75) Inventors: William C. Egbert, Minneapolis, MN (US); Thomas Herdtle, Inver Grove Heights, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 317 days.

(21) Appl. No.: 10/807,072

(22) Filed: Mar. 23, 2004

(65) Prior Publication Data

US 2005/0212707 A1 Sep. 29, 2005

(51) Int. Cl.
*G08B 13/14* (2006.01)

(52) U.S. Cl. .................. 340/572.7; 340/572.4

(58) Field of Classification Search ............. 340/572.7, 340/572.1, 572.4, 572.5
See application file for complete search history.

(56) References Cited

U.S. PATENT DOCUMENTS

| | | | |
|---|---|---|---|
| 4,260,990 A | 4/1981 | Lichtblau | |
| 4,694,283 A * | 9/1987 | Reeb | 340/572.5 |
| 4,782,345 A | 11/1988 | Landt | |
| 5,142,292 A | 8/1992 | Chang | |
| 5,182,570 A | 1/1993 | Nysen et al. | |
| 5,285,191 A * | 2/1994 | Reeb | 340/572.5 |
| 5,940,043 A | 8/1999 | Canipe et al. | |
| 5,977,875 A | 11/1999 | Lin et al. | |
| 6,037,879 A | 3/2000 | Tuttle | |
| 6,043,792 A | 3/2000 | Finlayson | |
| 6,107,920 A | 8/2000 | Eberhardt et al. | |
| 6,164,551 A | 12/2000 | Altwasser | |
| 6,285,342 B1 * | 9/2001 | Brady et al. | 343/895 |
| 6,304,169 B1 | 10/2001 | Blama et al. | |
| 6,459,588 B1 | 10/2002 | Morizumi et al. | |
| 6,466,131 B1 | 10/2002 | Tuttle et al. | |
| 6,480,110 B2 | 11/2002 | Lee et al. | |
| 6,522,308 B1 | 2/2003 | Mathieu | |
| 6,563,425 B2 * | 5/2003 | Nicholson et al. | 340/572.7 |
| 6,567,050 B1 | 5/2003 | Briggs | |
| 6,724,310 B1 * | 4/2004 | Gershenfeld et al. | 340/572.4 |
| 6,853,345 B2 | 2/2005 | King et al. | |
| 7,045,435 B1 * | 5/2006 | Liu | 438/427 |

(Continued)

FOREIGN PATENT DOCUMENTS

EP 0 867 966 9/1998

(Continued)

OTHER PUBLICATIONS

Carr, Joseph J., "Practical Antenna Handbook," 3rd Edition, pp. 291-297 and 307-309, 1998.

(Continued)

*Primary Examiner*—John Tweel, Jr.
(74) *Attorney, Agent, or Firm*—Melissa E. Buss

(57) ABSTRACT

Radio frequency identification (RFID) tags include compensating elements. The compensating elements enhance the operation of a compensated RFID tag, even when in close proximity to other RFID tags, whether the other tags are compensated or uncompensated. The compensating elements can include a closed loop of conductive material added to a RFID tag antenna. The conductive loop compensates the RFID tag performance when multiple RFID tags are in close proximity, keeping the frequency response of the assembled group of tags substantially centered near the operating frequency of the RFID system.

48 Claims, 15 Drawing Sheets

U.S. PATENT DOCUMENTS

| | | |
|---|---|---|
| 2002/0003496 A1 | 1/2002 | Brady et al. |
| 2002/0180588 A1 | 12/2002 | Erickson et al. |
| 2002/0196126 A1 | 12/2002 | Eisenberg et al. |
| 2004/0046663 A1 | 3/2004 | Jesser |

FOREIGN PATENT DOCUMENTS

| | | |
|---|---|---|
| EP | 1 008 951 | 6/2000 |
| EP | 0 829 921 B1 | 6/2001 |
| JP | 2003 087044 | 3/2003 |
| WO | 98/05088 | 2/1998 |
| WO | 98/31070 | 7/1998 |
| WO | WO 02/15139 | 2/2002 |
| WO | WO 03/096478 | 11/2003 |

OTHER PUBLICATIONS

The ARRL Handbook for Radio Amateurs—The Standard in Applied Electronics and Communications, 2001, pp. 20.36-20.39 and 20.68-20.69, 2000.

"Multi-Loop Antenna For Radio Frequency Identification (RFID) Communication", filed Feb. 20, 2004, U.S. Appl. No. 10/784,124.

"Multi-Loop Antenna For Radio-Frequency Identification", filed Mar. 3, 2003, U.S. Appl. No. 10/378,458.

* cited by examiner

RADIO FREQUENCY IDENTIFICATION TAGS WITH COMPENSATING ELEMENTS

TECHNICAL FIELD

The invention relates to the use of radio frequency identification systems for document and file management and, more specifically to radio frequency identification tags for radio frequency identification systems.

BACKGROUND

Radio-Frequency Identification (RFID) technology has become widely used in virtually every industry, including transportation, manufacturing, waste management, postal tracking, airline baggage reconciliation, and highway toll management. A typical RFID system includes RFID tags, an RFID reader having an antenna, and a computing device. The RFID reader includes a transmitter that may provide energy or information to the tags, and a receiver to receive identity and other information from the tags. The computing device processes the information obtained by the RFID reader.

In general, the information received from the tags is specific to the particular application, but often provides identification for an article to which the tag is fixed, which may be a manufactured article, a vehicle, an animal or individual, or virtually any other tangible article. Additional data may also be provided for the article. The tag may be used during a manufacturing process, for example, to indicate a paint color of an automobile chassis during manufacturing or other useful information.

The transmitter outputs RF signals through the antenna to create an electromagnetic field that enables the tags to return an RF signal carrying the information. In some configurations, the transmitter initiates communication, and makes use of an amplifier to drive the antenna with a modulated output signal to communicate with the RFID tag. In other configurations, the RFID tag receives a continuous wave signal from the RFID reader and initiates communication by responding immediately with its information.

A conventional tag may be an "active" tag that includes an internal power source, or a "passive" tag that is energized by the field. In either case, the RFID tags communicate using a pre-defined protocol, allowing the RFID reader to receive information from one or more tags. The computing device serves as an information management system by receiving the information from the RFID reader, and performing some action, such as updating a database or sounding an alarm. In addition, the computing device serves as a mechanism for programming data into the tags via the transmitter.

SUMMARY

Radio frequency identification (REID) tags include compensating elements. The function of the compensating element becomes discernable when a compensated REID tag is in the presence of a group of other REID tags. The compensating element increases the likelihood that the compensated RED tag will be detected by an REID system, even when in close proximity to other RED tags, whether the other REID tags are similarly compensated, differently compensated, or uncompensated.

The compensating element can include a closed loop of conductive material placed substantially proximate to the RFID tag antenna. In use, the compensating element is electromagnetically coupled to the RFID tag antenna such that the primary current induced in the RFID antenna induces a counter-circulating parasitic current in the compensating element. This parasitic current results in reduced tag-to-tag coupling between the compensated RFID tag and the other RFID tags in the group.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
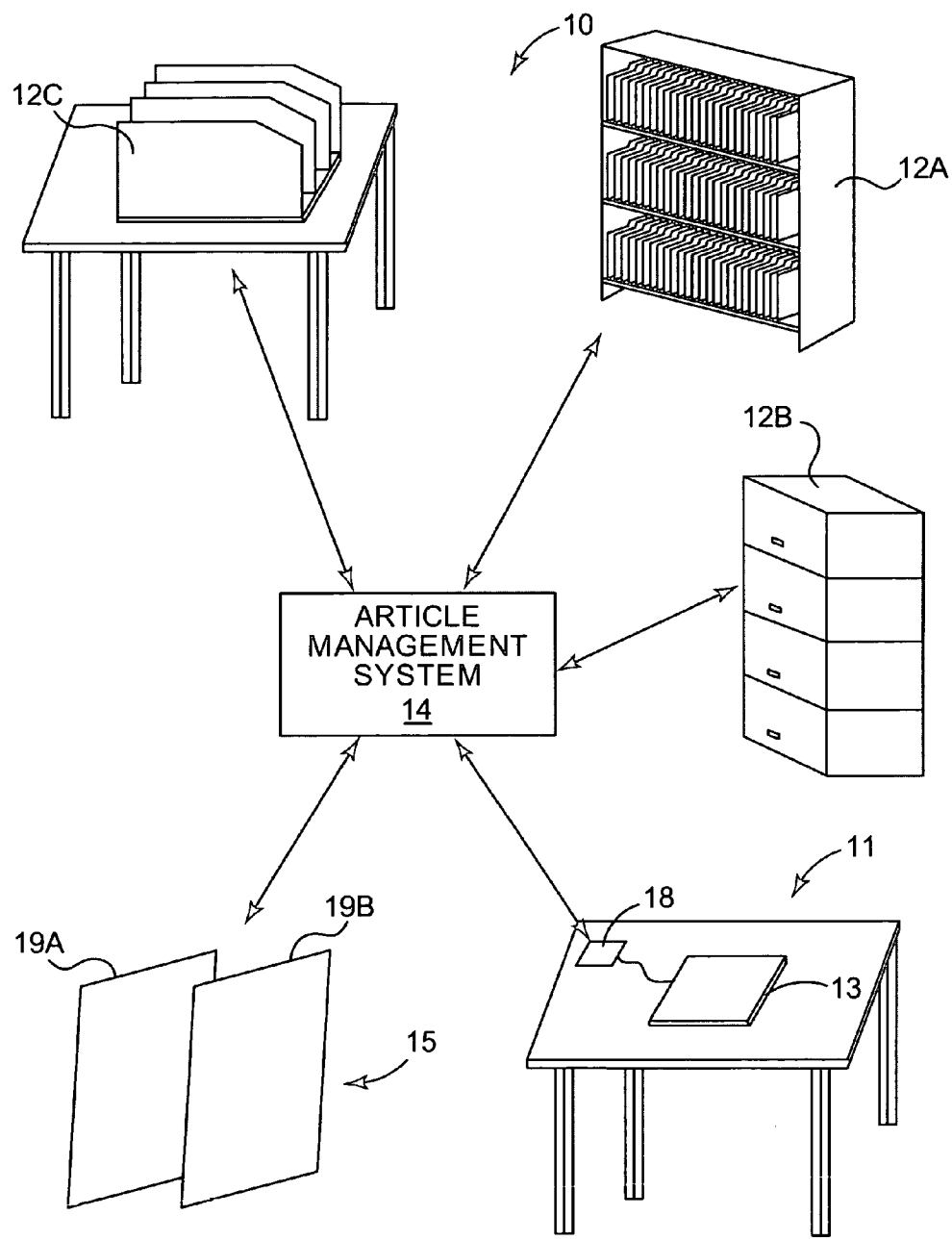
FIG. 1 is a block diagram illustrating a radio frequency identification (RFID) system in which RFID tags incorporate compensating elements in accordance with the techniques described herein.

FIG. 1 is a block diagram illustrating an example RFID system 10 in which RFID tags incorporate compensating elements in accordance with the techniques described herein. In the illustrated example of FIG. 1, RFID system 10 is used to track books, documents, files or other articles. The RFID system may, for example, be deployed within libraries, law offices, government agencies, or other facilities that generate and/or store documents and files, such as business, criminal, and medical records. The articles contain RFID tags that uniquely identify the articles. In addition, each RFID tag may also contain information describing the article, and status information indicating whether removal of the article is authorized. The RFID tags may be embedded within the articles so that the tags are substantially imperceptible, thereby reducing or prevent tampering.

As illustrated in FIG. 1, RFID system 10 includes an exit control system 15 that detects unauthorized removal of articles from a protected area. For example, the protected area may be a library and the articles may be books or other articles that are generally checked out from and back into the library. The techniques could also be applied to other kinds of articles without departing from the scope of the present invention.

Exit control system 15 includes lattices 19A and 19B which define an interrogation zone or corridor located near the exit of protected area. The lattices 19A and 19B include antennas for interrogating the RFID tags as they pass through the corridor to determine whether removal of the article to which the tag is attached is authorized. Exit control system 15 may utilize at least one RFID reader (not shown) to drive the antennas. To detect a tag, the RF reader outputs RF power through the antennas to create an electromagnetic field within the interrogation corridor. In general, the terms "electromagnetic field" and "magnetic field" are used interchangeably herein as the magnetic component is used to couple with the RFID tags.

The RF reader receives information from any tags present within the interrogation corridor, and exit control system 15 determines whether removal of the article is authorized. If removal of the article is not authorized, exit control system 15 initiates some appropriate security action, such as sounding an audible alarm, locking an exit gate, or other action.

In addition, RFID system 10 includes a check-in/check-out area 11 by which an authorized person processes articles for removal or return. In particular, check-in/check-out area 11 includes an RFID reader 18 for interrogating RFID tags fixed to articles and changing their status as desired, e.g., checking-in or checking-out the articles. The check-in/check-out area 11 may be used, for example, to check file folders out of a file room or to check books out of library.

In addition, articles may be positioned in a number of storage areas e.g., on an open shelf 12A, a cabinet 12B, a vertical file separator 12C (collectively, "storage areas 12") or other location, as shown in FIG. 1. Each storage area 12 includes tag interrogation capability which enables tracking of articles throughout a facility. File folders in an office or medical setting, for example, could be tracked throughout the facility via storage areas 12. In a library setting, for example, a book could be tracked after check-in while on shelf 12A.

To provide RFID interrogation capability, each article stored within storage areas 12 has an associated RFID tag. The tag may be embedded within the article or applied to the article or to the packaging of the article so that the tag is at least substantially imperceptible, which can help to prevent detection and tampering. The RFID tag may be applied at the end user location, or may be inserted into or applied to an article during its manufacture, as with a file folder, document, book, or the like.

Individual tags for RFID systems operating in the high-frequency (HF) range, e.g., greater than 3 megahertz (MHz), of the electromagnetic spectrum typically use inductive loop antennas, with diametric sizes ranging from a few millimeters (mm) to a few tens of mm. A silicon die attached to the inductive loop antenna provides electronic functions that may include signal receive and send, data processing, unique identification information, and data storage and retrieval. RFID readers or interrogators located within RFID system 10, e.g., at exit control system 15, check-in/check-out station 11, and storage locations 12, use antennas to communicate with the RFID tags by electromagnetic (wireless) transmitted and received signals. The RFID readers in turn communicate with an article management system 14, either through a wireless link or a wired cable connection.

The RFID tag may be powered by an electrochemical battery (a so-called "active tag"), or the RFID tag may draw its power entirely from the RF field emanating from the reader (a so-called "passive tag"). In the latter case the RFID tag may remain unpowered and dormant indefinitely, with no requirement for maintenance of batteries or external power supplies. Although the following discussion will focus mainly on passive (i.e., battery-less) RFID tags, it shall be understood that the invention is not limited to passive tags, and that the principles and results described herein are also applicable to active HF RFID tags with inductive loop antennas.

REID system 10 may operate in a band of the electromagnetic spectrum defined by governmental regulations for electromagnetic radiation emissions. For example, REID system 10 may operate at a common worldwide standard in the Industrial-Scientific-MediCal (ISM) band centered at 13.56 MHz with an allowable frequency variance of +/−7 kHz. However, other frequencies may be wed for REID applicatioDs, and the invention is not so limited. For example, some REID systems in large storage areas such as a warehouse may use an RFID system that operates at approximately 900 MHz. It shall be understood that one skilled in the art could reasonably extend the operation of RFID system 10 to other frequencies, for example, inductive loop RFID antennas operating at frequencies other than 13.56 MHz in the HF band, and to other bands, e.g., the Low Frequency (LF) band at 125 kHz to 138 kHz.

The antennas of the readers and interrogators located within RFID system 10 typically couple to the RFID tags through near-field magnetic induction. A time-varying RF field produced by a reader, for example, couples by magnetic induction to a loop antenna on the RFID tag, inducing an electromotive force ("voltage") in the conductive loop or loops of the RFID tag antenna. The induced electromotive force drives electrical currents through the RFID tag antenna. The electrical power received by the RFID tag antenna is converted by the RFID die to the electrical voltage required to operate the internal circuits of the die. The reader communicates with the RFID die by suitable modulation of the carrier frequency. The die communicates with the reader by modulating the load it presents to the RFID tag antenna, causing modulated back-scatter of the RF field surrounding the RFID tag. The reader's receiver detects the back-scattered signal from the RFID tag. The distance at which the reader can reliably communicate with the tag, the "read range", is a function of reader design, radiated power, RFID die design, RFID tag antenna, and reader-tag antenna orientation.

To achieve the maximum read range, the RFID tags can be tuned to be electrically resonant near the operating frequency of the RFID system. Tuning to the system operating frequency supports maximum energy transfer from the RF field to the RFID tag.

The RFID interrogators or readers communicate position information to article management system 14 that provides a central data store for aggregation of the position information. Article management system 14 may be networked or otherwise coupled to one or more computers so that individuals at various locations can access data relative to those articles.

Collection and aggregation of the position information may be useful for a number of purposes. For example, a user may request the location of a particular article or group of articles, such as a file or a group of books. Article management system 14 may retrieve position information from the data store, and report to a user the last location at which the articles were located within one of the storage areas. Optionally, article management system 14 can re-poll or otherwise re-acquire the current location of the article to verify that the article is in the location indicated in the database.

As mentioned above, each of the storage areas 12 of system 10 may be equipped with one or more reader antennas for interrogating the articles to aid in determining which articles are located at each of the storage areas. One example reader antenna which may be used is described in copending and commonly assigned U.S. patent application Ser. No. 10/378,458 filed Mar. 3, 2003, the entire content of which is incorporated herein by reference. One or more antennas may be positioned within open shelf 12A to create an electromagnetic field for communicating with the RFID tags associated with the articles stored therein. Similarly, antennas may be located within cabinet 12B, vertical file separator 12C, desktop reader, and or other location. The antennas may be positioned in various ways, such as on top or bottom of each shelf, at the back of the shelves, or supported vertically, interspersed among the files. The antennas can be retrofitted to existing shelves or built into a shelf and purchased as a unit. The system may be configured to interrogate, or poll, the RFID tags in any number of ways. For example, the antennas may poll the RFID tags continuously, poll the tags in a sequence specified by the user, or poll the tags on demand.

Often, a group of articles with RFID tags, such as file folders on a shelf, are located in close proximity in a reader or interrogator of RFID system 10. Conventional RFID tags, including tags tuned for optimum function at the RFID system operating frequency $f_0$, would tend to show significant interference, i.e., tag-to-tag coupling, when in close proximity to each other. This interference results in an inability to "read" or identify some or all of the individual RFID tags in the group. As a result, accurate or up to date information as to the location of each individual article tagged with conventional RFID tags may not be obtained.

In contrast, RFID system 10 utilizes "compensated RFID tags" tat incorporate compensating elements 30. Compensated RFID tags arc useful, for example, where it may be desirable to read a group of RFID tags that are in close proximity to each other. For example, RFID) tags attached to file folders or books may be in close proximity to other RFID tags when the articles containing the tags are stored on a shelf or in a drawer, or carried through an exit control system. The compensated RFID tags are designed such that each compensated RFID tags, may be read individually as well as when it is in close proximity to other RFID tags, regardless of whether the other RFID tags are similarly compensated, differently compensated, or uncompensated.

Various example embodiments of compensating elements and compensated RFID tags will now be given with respect to FIGS. 2-12. A detailed description of the operation of various example embodiments of compensating elements and of compensated RFID tags is given in more detail below with respect to FIGS. 13-17.

Figure 2:
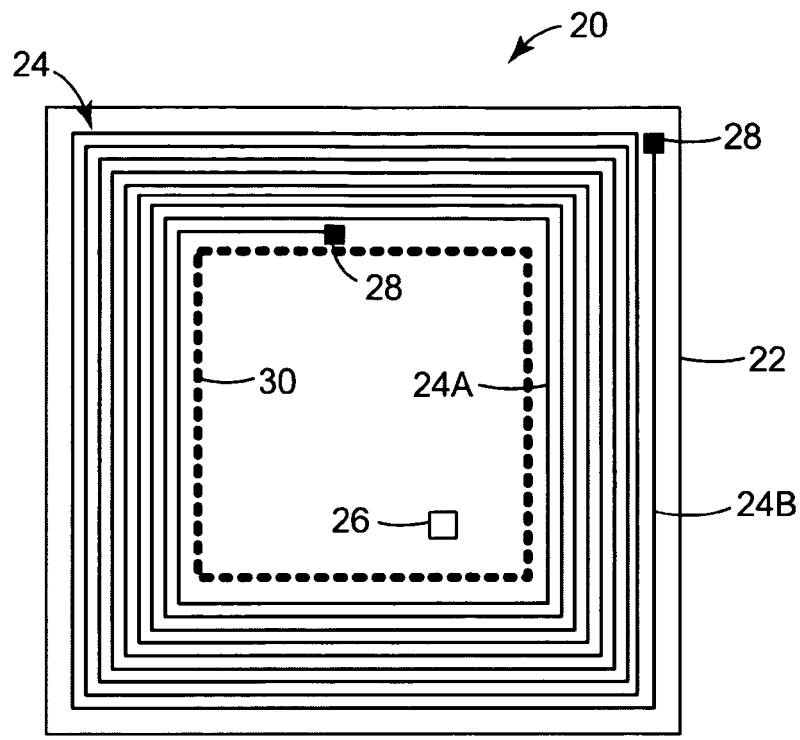
FIG. 2 is a schematic diagram of one example embodiment of a compensated RFID tag according to the techniques described herein.

FIG. 2 is a schematic diagram illustrating an example embodiment of an RFID tag 20 having a compensating element 30. An RFID tag 20 having a compensating element will be referred to herein generally as a "compensated RFID tag 20" or "compensated RFID tag". Conventional, uncompensated RFID tags known in the art will be referred to as "uncompensated RFID tags." For ease of illustration, compensating element 30 is shown in FIG. 2 as lying entirely within innermost loop 24A of the antenna 24. It shall be understood, however, that the specific location of compensating element 30 shown in the embodiment of FIG. 2 is one of many embodiments where the compensating element may be located with respect to antenna 24, and that the invention is not limited in this respect. Alternate embodiments of compensated RFID tags 20 and compensating elements 30 will be shown and described in more detail below.

A substrate 22 provides support for antenna 24, compensating element 30 and the other components of compensated RFID tag 20. Antenna 24 is a multi-turn inductive loop antenna having multiple loops, including innermost loop 24A and outermost loop 24B. Although antenna 24 is shown throughout the FIGURES as a multi-turn inductive loop antenna, it shall be understood that antenna 24 may have a single loop, or may also have more or fewer loops than are explicitly shown in the FIGURES, and that the number of loops on antenna 24 is not to be taken as limiting. Antenna 24 may be formed on substrate 22 by any of several conductive pattern technologies, or may be formed separately and transferred to the substrate. One or more tuning capacitors (not shown) may be connected to antenna 24 to form an electrical resonant circuit. The multiple loops of antenna 24 are closed through one or more via connections 28. RFID die 26 may be connected to antenna 24 using any one of several interconnection technologies, such as conductive adhesives, solder, or metal-to-metal contact.

In the embodiment shown in FIG. 2, compensating element 30 is a closed loop of conductive material. In one embodiment, the compensating element 30 lies substantially in a plane parallel and proximate to the plane of antenna 24 for which it provides compensation. In another embodiment, compensating element 30 lies substantially in the same plane of (i.e., is substantially coplanar with) antenna 24 for which it provides compensation. These and other embodiments of compensated RFID tags 20 and of compensating elements 30 will be described in further detail below.

The embodiment of the compensating element 30 shown in FIG. 2 is substantially rectilinear in shape and is of similar shape to antenna 24. However, it shall be understood that the compensating element 30 may take many other shapes, and that it need not be similarly shaped to antenna 24. The term "closed loop" therefore can be defined as any shape closed upon itself, for example, square, rectangle, circle, ellipse, triangle, any other multi-sided, or smoothly-sided shape closed upon itself such that an electrical current can flow in the loop. These and other embodiments of the compensating element 30 and compensated RFID tag 20 will be readily understood to those of skill in the art upon reading and understanding the present specification.

The function of the compensating element 30 is relevant when the compensated RFID tag 20 is in the presence of at least one other RFID tag. In use, the compensating element 30 is electromagnetically coupled to the RFID tag antenna 24 such that the primary current induced in the RFID antenna 24 induces a counter-circulating parasitic current in the compensating element 30. This parasitic current results in reduced tag-to-tag coupling between the compensated RFID tag and the other RFID tags in the group. The compensating element 30 thus increases the likelihood that the compensated RFID tag 20 will be detected by the RFID system 10, even when in close proximity to other RFID tags, whether the other RFID tags are similarly compensated, differently compensated, or uncompensated. Operation of the compensating element 30 will be described in more detail below with respect to FIGS. 13-17.

The compensating element 30 may be formed in any one of several ways. One method is to form the compensating element 30 as part of the RFID tag antenna 24 during manufacture, using the same operations that are used to manufacture the basic antenna structure. Examples of circuit-forming operations include but are not limited to, die cutting or patterning metal foil, electroplating conductive metals, printing conductive inks, printing precursor materials (e.g., metallo-organic compounds) that are reduced to a conductive state by subsequent heating or drying, and the like. The substrate 22 may be a polymer film, paper, rigid plastic film, electronic circuit board, or other similar non-conductive materials.

Another approach is to form the compensating element 30 in a manufacturing operation, separate from the antenna manufacture, on the first or second surface of the RFID antenna 24, using either the same process used to create the patterned conductive antenna 24, or using a different process.

Yet another approach is to form the compensating element 30 as a separate circuit by any of the diverse conductive pattern forming techniques noted previously. The compensating element 30 may be placed in close proximity to, but not attached to, the RFID tag 20. Or, the compensating element 30 may be attached to the RFID tag antenna 24 to form a single unit, using, for example, an adhesive film, curable adhesive pastes, double-sided pressure sensitive adhesive tape, or the like, to create a suitable configuration of the compensating element 30 proximate to the RFID tag antenna 24.

Figure 3:
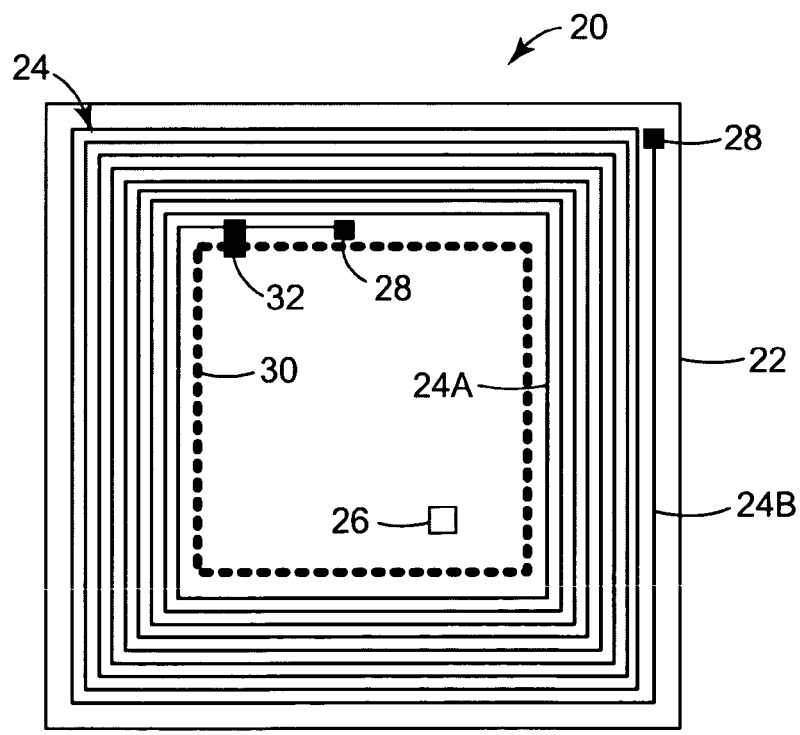
FIGS. 3-10 are schematic diagrams of additional example embodiments of compensated RFID tags.

FIG. 3 shows another embodiment of a compensated RFID tag 20 with a compensating element 30. Again, for ease of illustration, the compensating element 30 is shown, in this embodiment, as lying entirely within the innermost loop 24A of antenna 24. In FIG. 3, the compensating element 30 is electrically connected to antenna 24 via a conductive jumper (short circuit) 32 connecting innermost coil 24A to the compensating element 30 at one point on the perimeter of the compensating element 30. In other words, the compensating element 30 may be in electrical contact with the RFID tag antenna 24 and still perform the compensation function described herein.

In FIG. 2, the compensating element 30 was not electrically connected to the antenna 24. It shall be understood that the compensating element 30 may be electrically connected to the RFID tag antenna 24, or it may be located proximate to, but electrically isolated from, the RFID tag antenna 24. Either arrangement, whether the compensating element 30 is electrically connected to or electrically isolated from the RFID tag antenna 24, results in a compensating element 30 can have the compensating effect described herein.

Figure 4:
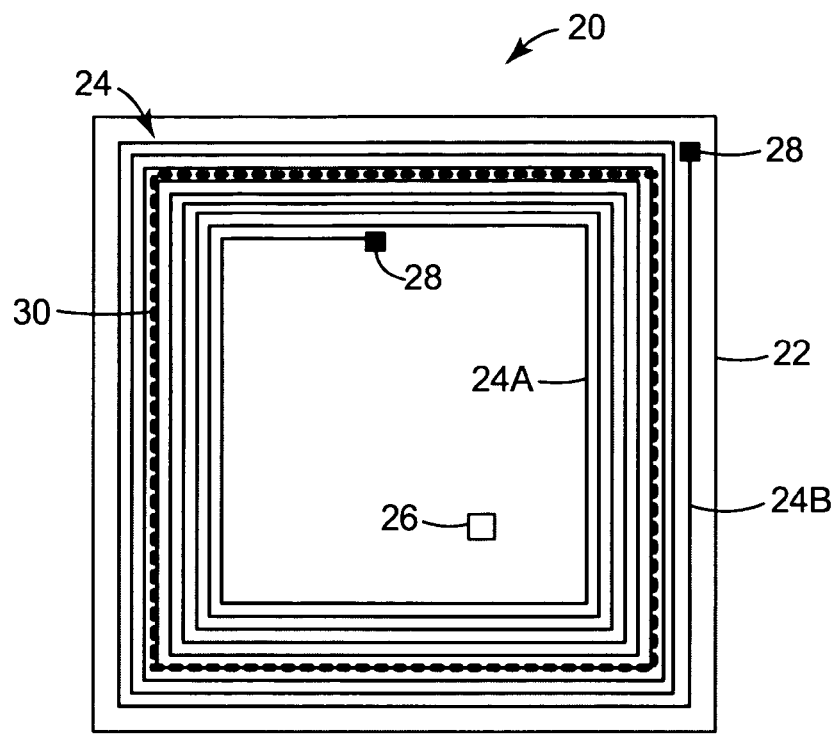

FIG. 4 shows another example embodiment of a compensated RFID tag 20. There, compensating element 30 is interspersed between loops of antenna 24. The compensating element 30 could, in fact, be located between any of the loops of the antenna 24 and still have the compensating effect described herein.

Figure 5:
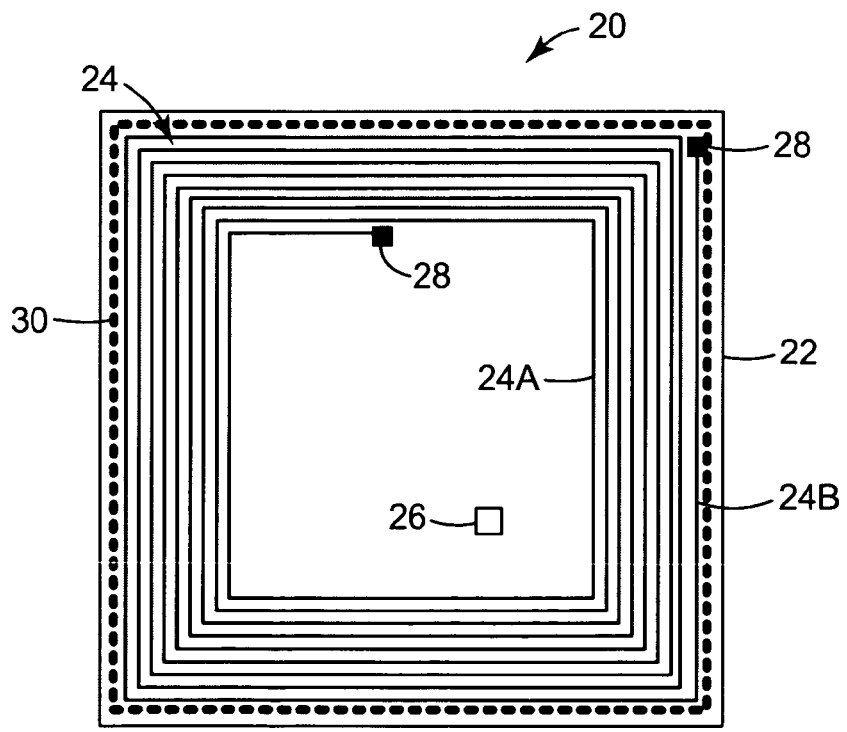

FIG. 5 shows another embodiment of a compensated RFID tag 20. In this embodiment, the compensating element 30 is located outside of outermost loop 24B of antenna 24. The embodiments shown in FIGS. 2-5 demonstrate that the compensating element 30 may be located entirely inside of, interspersed with, or entirely outside of the loops of the antenna 24 without departing from the scope of the present invention.

Figure 6:
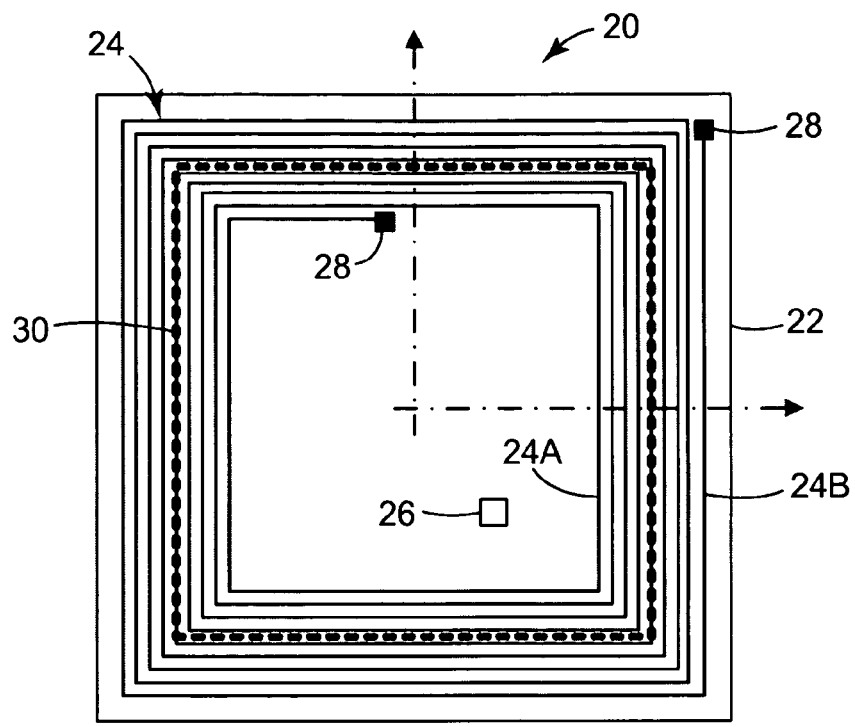

FIG. 6 shows a compensated RFID tag 20 including a compensating element 30 having an axis that is substantially aligned with the axis of the antenna 24. That is, the lines of the compensating element 30 are substantially parallel to the corresponding lines of antenna 24.

Figure 7:
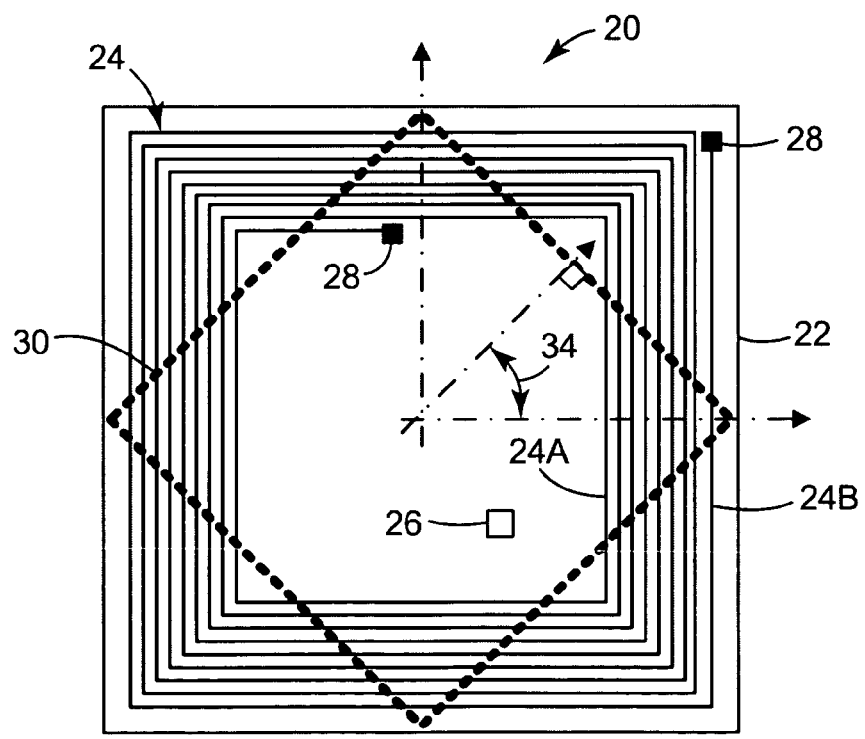

FIG. 7 shows another embodiment of a compensated RFID tag 20 having a compensating element 30 having an axis at an "offset angle" 34 of approximately 45 degrees with respect to the axis of antenna 24. In some RFID tag applications, an embodiment such as that shown in FIG. 6 may be the used. For example, when building the compensating element 30 into an RFID tag at the time of manufacture, substantial alignment of the compensating element 30 and the RFID tag antenna 24 can be ensured. In that case, the compensating element 30 can simply be incorporated into the artwork for the production of the RFID tag 20 itself, and substantial alignment of compensating element 30 with the axis of the RFID tag antenna 24 can be achieved.

In other applications, an embodiment such as that shown in FIG. 7 may be appropriate. For example, when adding compensating elements 30 to conventional, uncompensated RFID tags, the compensating elements 30 may be placed, due to human error or by design, at an offset angle 34 with respect to the axis of antenna 24. It shall be understood, therefore, the angle of placement of the compensating element 30 with respect to the axis of antenna 24 is not a limiting factor for purposes of the present invention, and that any angular placement of the compensating element 30 with respect to the axis of antenna 24 is within the scope of the present invention.

Figure 8:
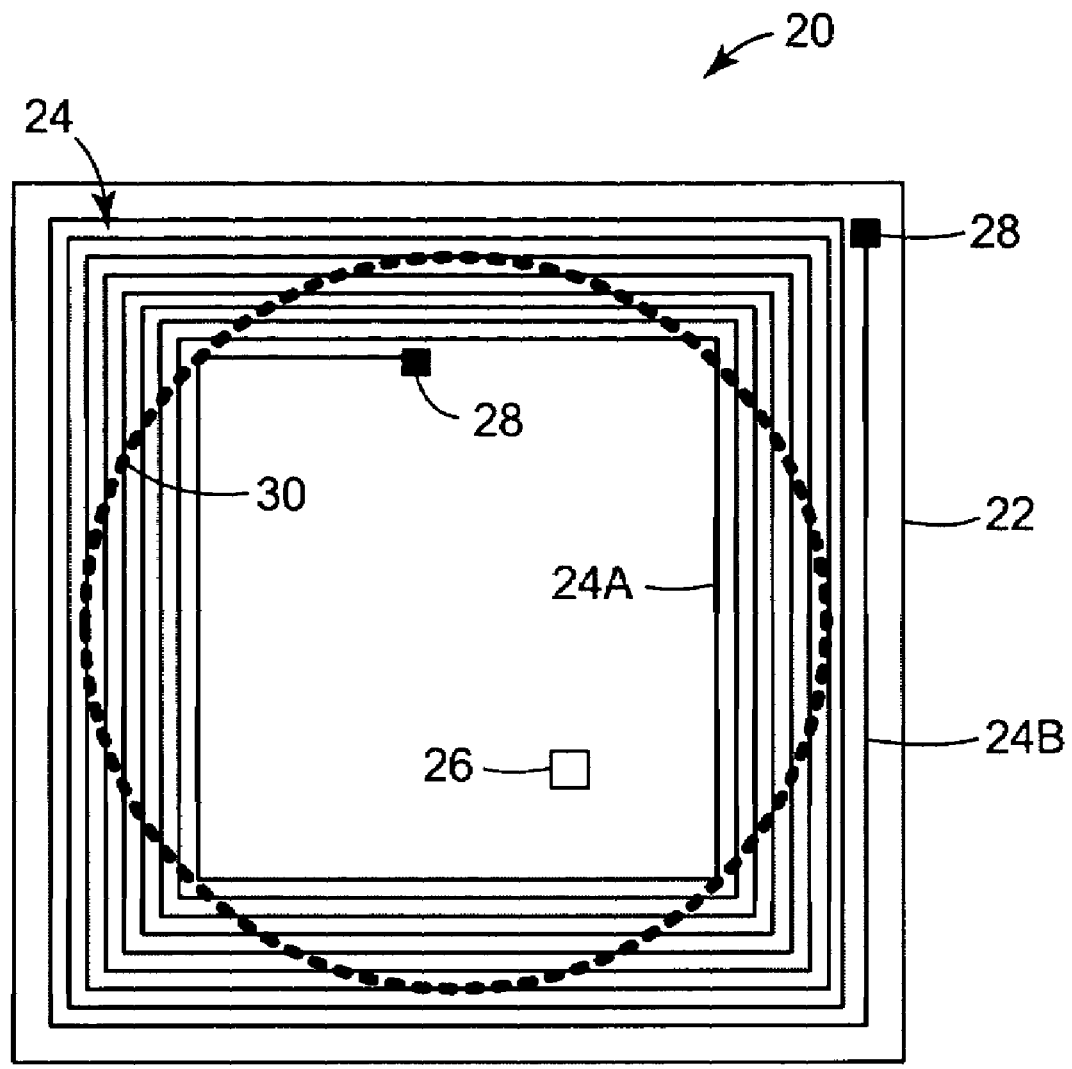

FIG. 8 shows another example embodiment of a compensated RFID tag 20. In this example embodiment, compensating element 30 is circular in shape, rather than rectilinear in shape as those described above with respect to FIGS. 2-7. Indeed, the compensating element 30 may take virtually any other shape, including triangular, elliptical, square, rectangular, or any of a myriad of other multi-sided or smoothly-sided closed shapes and still perform the compensating function. It shall be understood, therefore, that the shape of the compensating element 30 is not a limiting factor for purposes of the present invention, and that the compensating element 30 may take virtually any shape without departing from the scope of the present invention. The placement of a circular compensating element 20 such as that shown in FIG. 8 will not demonstrate angular dependence, since the circular loop is circumferentially symmetric around the center of the loop. The effect of the compensating circuit element 20 will be maximized when the geometric center of the compensating circuit element 20 is coincident with the geometric center of the RFID tag antenna 24.

Figure 9A:
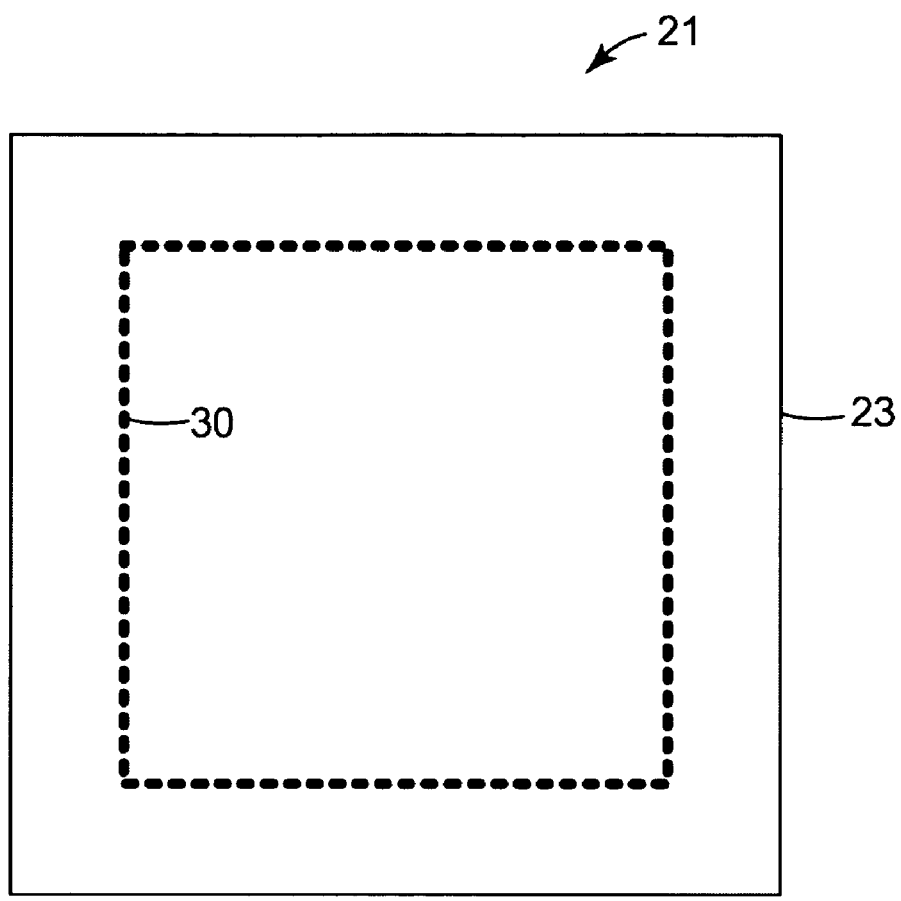
Figure 9B:
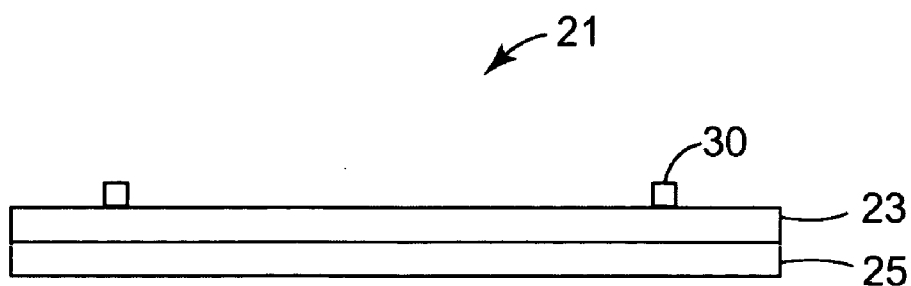

FIG. 9A shows a top view and FIG. 9B shows a side view of an example embodiment of a supplemental compensating article 21. Supplemental compensating article 21 includes a compensating element 30 located on a top side of substrate 23, with an adhesive surface 25 disposed on the opposite side of the substrate 23. Supplemental compensating article 21 can be used to add compensation to conventional, uncompensated RFID tags in the manner shown in FIG. 10. Adhesive surface 25 can be an adhesive film, curable adhesive pastes, double-sided pressure sensitive adhesive tape, or the like.

Figure 10:
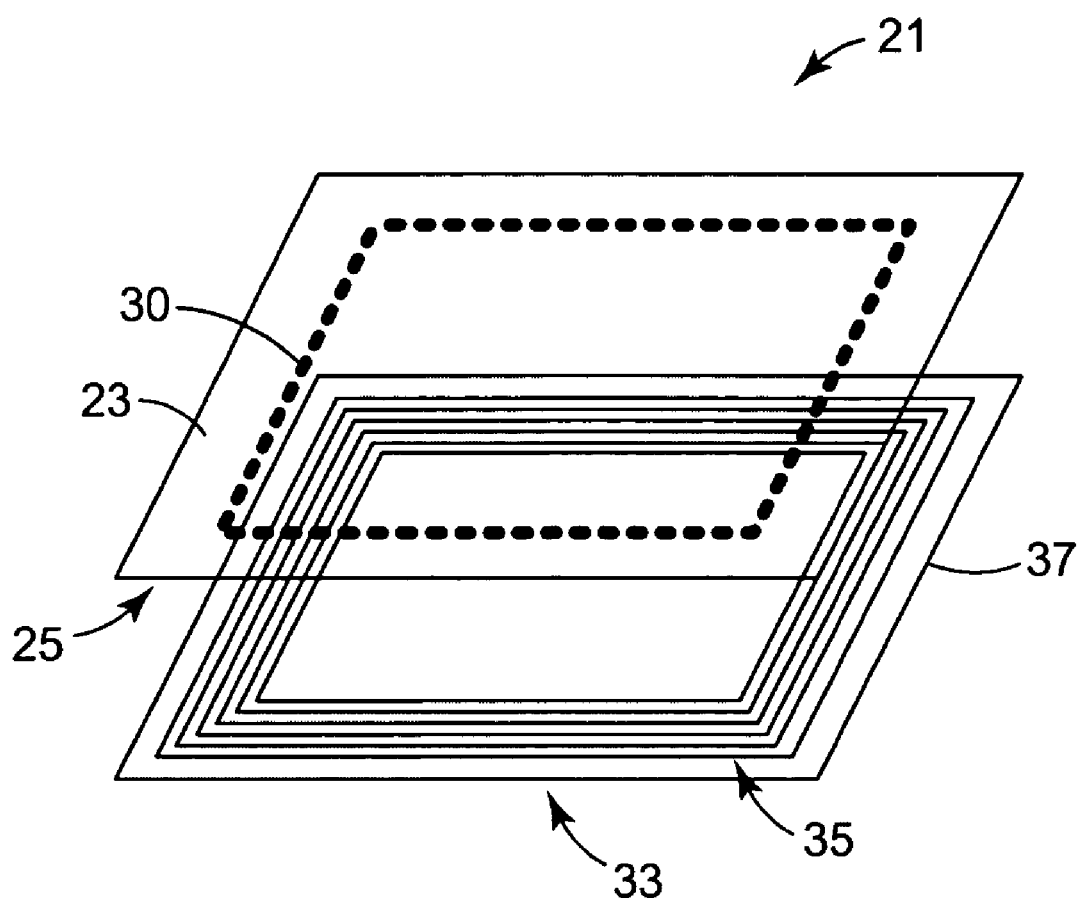

FIG. 10 shows perspective view of a conventional, uncompensated RFID tag 33 with an RFID antenna 35 deposited on a substrate 37. To improve the performance of this uncompensated RFID tag 33, a supplemental compensating article 21 can be adhered to the uncompensated RFID tag 33. The adhesive surface 25 on the underside of the substrate 23 of the supplemental compensating article 21 is brought into contact with the uncompensated RFID tag 33. In the case of a non-rotationally independent shape (e.g., square, rectangle, ellipse, etc.) the compensating element 30 could be substantially aligned with or placed at an off set angle with respect to the axis of the RFID antenna 35. Alternatively, the adhesive surface 25 could be placed between the compensating element 30 and the substrate 23, or on top of the compensating element 30. The supplemental compensating article 21 would then be attached appropriately. Use of the supplemental compensating article 21 allows users of conventional, uncompensated RFID tags to easily add compensating elements to their conventional, uncompensated RFID tags without requiring the purchase of an entirely new set of tags.

Figure 11A:
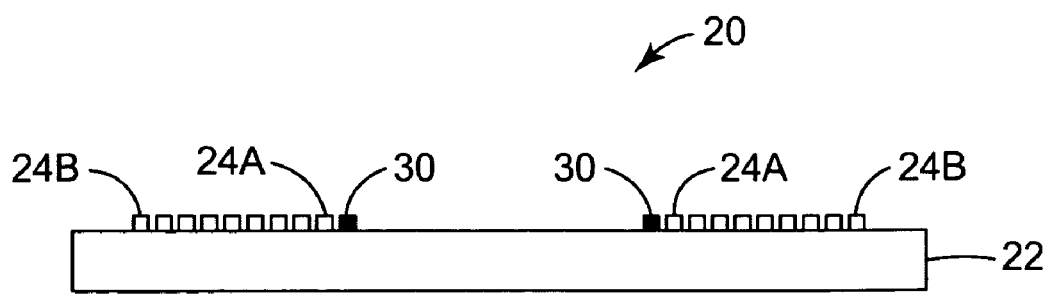
FIGS. 11A-11C are side view perspective diagrams of additional example embodiments of compensated RFID tags.
Figure 11B:
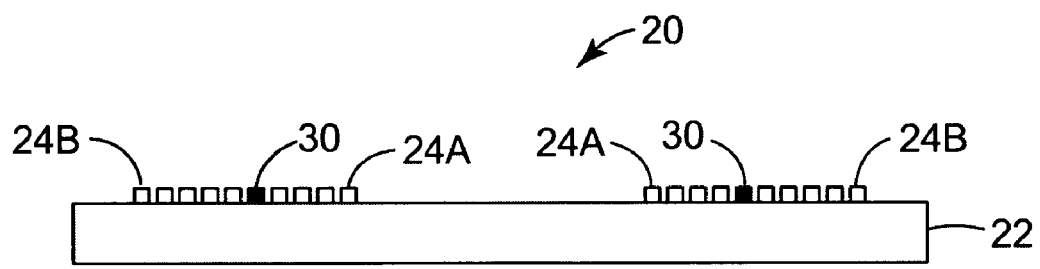
Figure 11C:
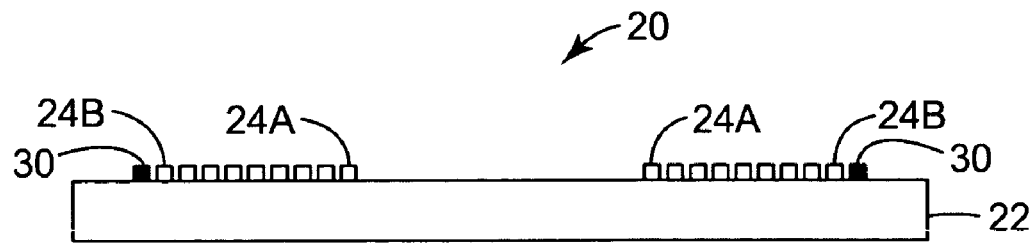

FIGS. 11A, 11B and 11C are side views of example embodiments of compensated RFID tags 20. Each of FIGS. 11A, 11B, and 11C shows a compensated RFID tag 20 having a substrate 22 and an RFID antenna 24. The compensating element 30 in each of FIGS. 11A-11C is located substantially in the plane of antenna 24. The compensating element 30 may be located entirely within innermost loop 24A (FIG. 11A), interspersed between loops (FIG. 11B), or located entirely outside of outermost loop 24B (FIG. 11C).

Figure 12A:
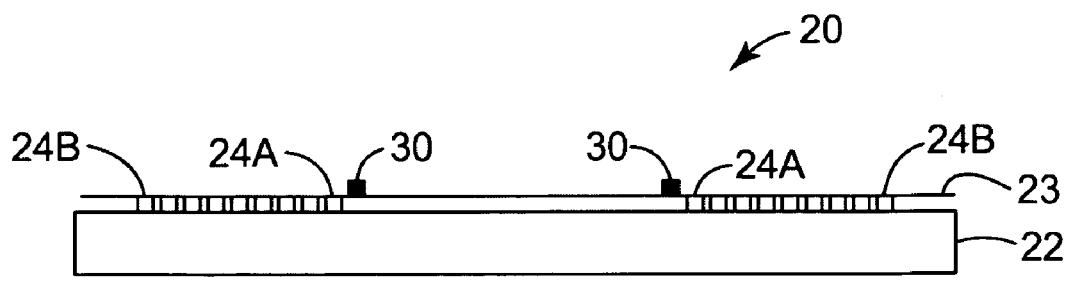
FIGS. 12A-12C are side view perspective diagrams of additional example embodiments of compensated RFID tags.
Figure 12B:
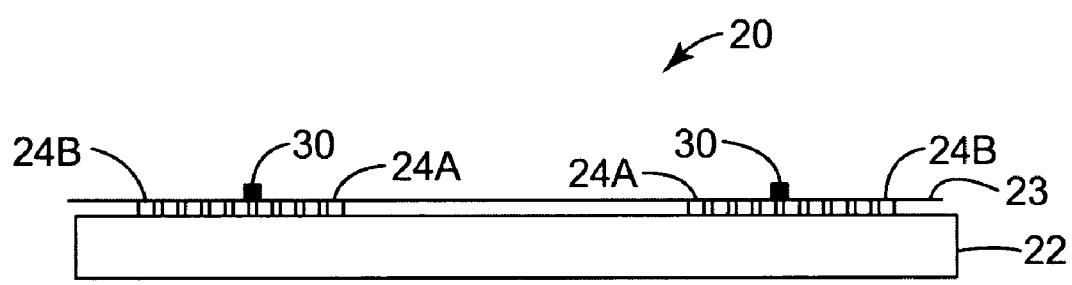
Figure 12C:
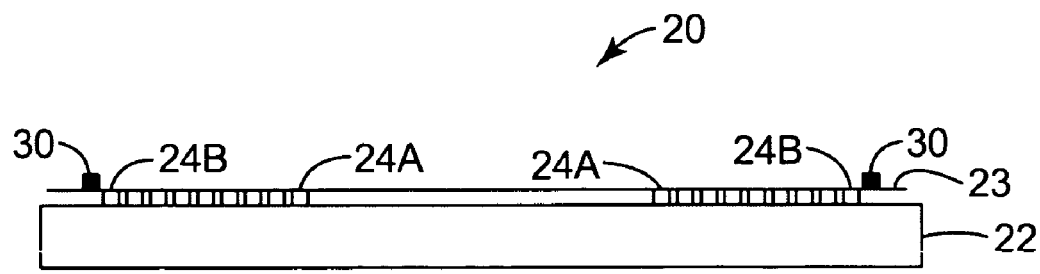

FIGS. 12A, 12B and 12C are side views of additional example embodiments of compensated RFID tags 20. Each of FIGS. 12A, 12B, and 12C shows a compensated RFID tag 20 having a substrate 22 and an RFID antenna 24. The compensating element 30 in each of FIGS. 12A-12C is located in a plane substantially parallel and proximate to the plane of antenna 24. In these views, the compensating element 30 may be, but need not be physically separated by a substrate layer 23. Again, the compensating element 30 may be located entirely within innermost loop 24A (FIG. 12A), interspersed between loops (FIG. 12B), or located entirely outside of outermost loop 24B (FIG. 12C).

Now consider a group of articles, e.g., file folders, located on a shelf and marked with conventional, uncompensated RFID tags. When a conventional, uncompensated RFID tag is in close proximity to other RFID tags, as they could be in a group of shelved folders or similar articles, the electromagnetic field from the first uncompensated RFID tag interacts with and couples to other nearby RFID tags. The effective resonance frequency of the collection of interacting uncompensated RFID tags is shifted downward and may shift outside of the bandwidth of operation of the RFID system. When the resonant frequency of the group of uncompensated RFID tags is shifted away from the system operating frequency the communication between the reader and the group of uncompensated RFID tags may be degraded or lost entirely.

The compensating element 30 of a compensated RFID tag 20 modifies the effective inductance L of the compensated RFID tag antenna 24. The resonant frequency $f_{TAG}$ of the compensated RFID tag 20 is less affected by the near physical presence of other RFID tags. This is true for each compensated RFID tag 20 in the group, regardless of whether the other RFID tags in the group are similarly compensated, differently compensated, or uncompensated.

The compensated RFID tag 20 can be tuned so that its resonant frequency $f_{TAG}$ is centered near the operating frequency $f_0$ of RFID system 10 so that it may be read in isolation from other RFID tags. When the compensated RFID tag 20 is one of a group of other RFID tags, whether compensated or not, the compensated RFID tag response $f_{TAG}$ remains tuned near the system operating frequency. When the compensated RFID tag 20 is one of a group of compensated RFID tags, the compensated RFID tag response for each compensated tag remains tuned near the system operating frequency, and the group response $f_{GROUP}$ also remains tuned near the system operating frequency. In this way, the likelihood that the RFID system 10 will detect presence of a particular RFID tag in the group is increased when that tag is a compensated RFID tag, regardless of whether the other tags in the group are similarly compensated, differently compensated, or uncompensated. Similarly, the likelihood that the RFID system 10 will detect presence of all of the tags in the group is increased when all of the tags in the group are compensated RFID tags.

Figure 13:
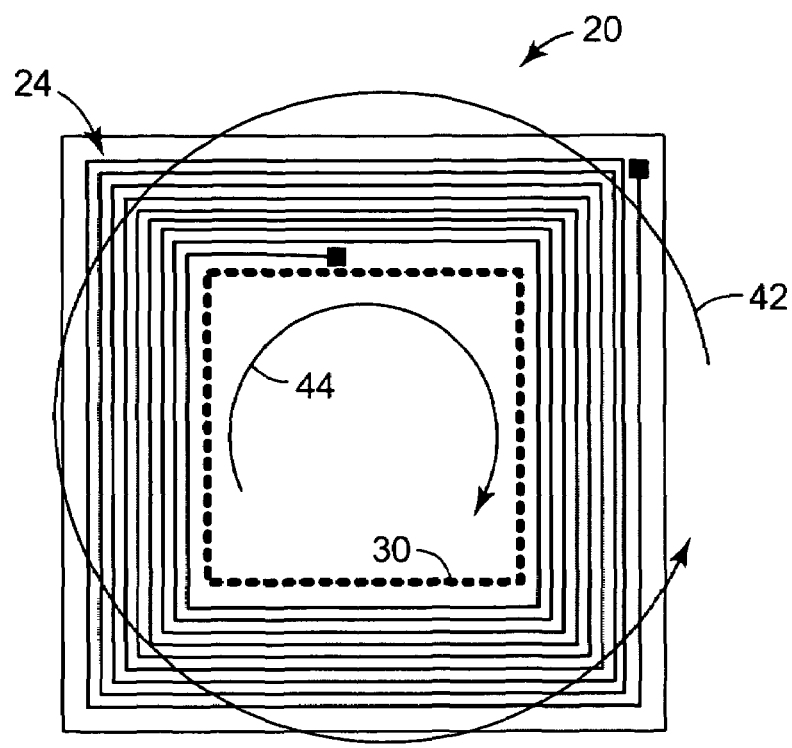
FIG. 13 is a diagram generally illustrating the direction of the currents in a compensated RFID tag.

FIG. 13 shows a diagram generally illustrating the direction of the currents circulating in a compensated RFID tag. In operation, the magnetic flux from the external magnetic interrogating field generated by the RFID reader of RFID system 10 induces a primary current, indicated generally by line 42, in the antenna 24 flowing, in the example of FIG. 13, in a counter-clockwise direction. This primary current 42 induces, by virtue of electromagnetic coupling, a counter-circulating parasitic current, indicated generally by line 44, in the compensating element 30. The results of the induced parasitic current 44 include a lowered effective inductance for the RFID tag antenna 24, an increased resonant frequency $f_{TAG}$, a reduced response, or sensitivity, to the magnetic field applied by the RF reader, and a reduction in tag-to-tag coupling. The overall result is that RFID system 10 is more likely to detect each compensated RFID tag 20 in a group of RFID tags.

Figure 14:
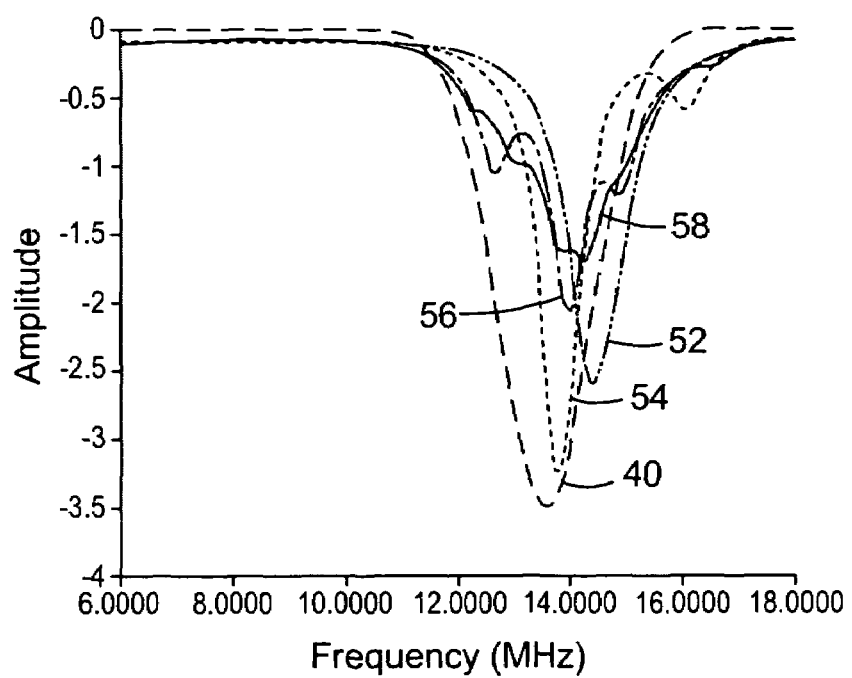
FIG. 14 is a graph showing example response of five compensated RFID tags in the presence of an interrogating field.

FIG. 14 shows responses for compensated RFID tags 20. Curve 40 indicates the response of RFID system 10. The single-tag compensated RFID tag response (curve 52) was tuned to be centered around 14.5 MHz, slightly higher than the system operating frequency $f_0$=13.56 MHz. It shall be understood, however, that a compensated RFID tag 20 could be tuned nearer to 13.56 MHz, for example, 13.56±1 MHz. When a second compensated RFID tag is aligned coaxially within 0.5 inch separation from the first compensated RFID tag, the resonant frequency of the pair is shifted down to 13.8 MHz as shown by curve 54. When five compensated RFID tags are brought together as shown by curve 56, the center resonance frequency of the group, 14.0 MHz, is nearly unchanged from the pair resonance (curve 54), and the response amplitude is within 0.5 dB of the single compensated RFID tag response (curve 52). When ten compensated RFID tags are stacked, the response curve 58 shows that the group resonance frequency peaks at 14.3 MHz, nearly unchanged from the two- and five-compensated RFID tag cases. Thus, each of the compensated RFID tags in the group is individually readable with a single RFID reader. FIG. 14 illustrates that the compensating element 30 results in compensated RFID tags in which one, two, or many tags may be read with an RFID reader operating at the system operating frequency.

The addition of compensating elements 30 to an inductively coupled RFID tag antenna 24 modifies the interaction of the compensated RFID tag 20 with the magnetic field component of the RF energy field generated by the antenna 24 incident on the compensating element 30. The inductance L characterizes the coupling between the current induced in the RFID tag antenna 24 and the magnetic flux through the antenna 24. The magnetic flux is a function of the magnetic field B, the area of the antenna A, and the number of turns N in the antenna. The magnetic field B is the vector sum of the fields created by the reader, the induced electrical current in the RFID tag, and the electrical currents in neighboring RFID tags. The compensating element 30 contributes to the net current flowing in the compensated RFID tag and "compensates" for the presence of the neighboring RFID tags, whether compensated or uncompensated, by reducing the apparent inductance L of the RFID antenna 24.

Figure 15A:
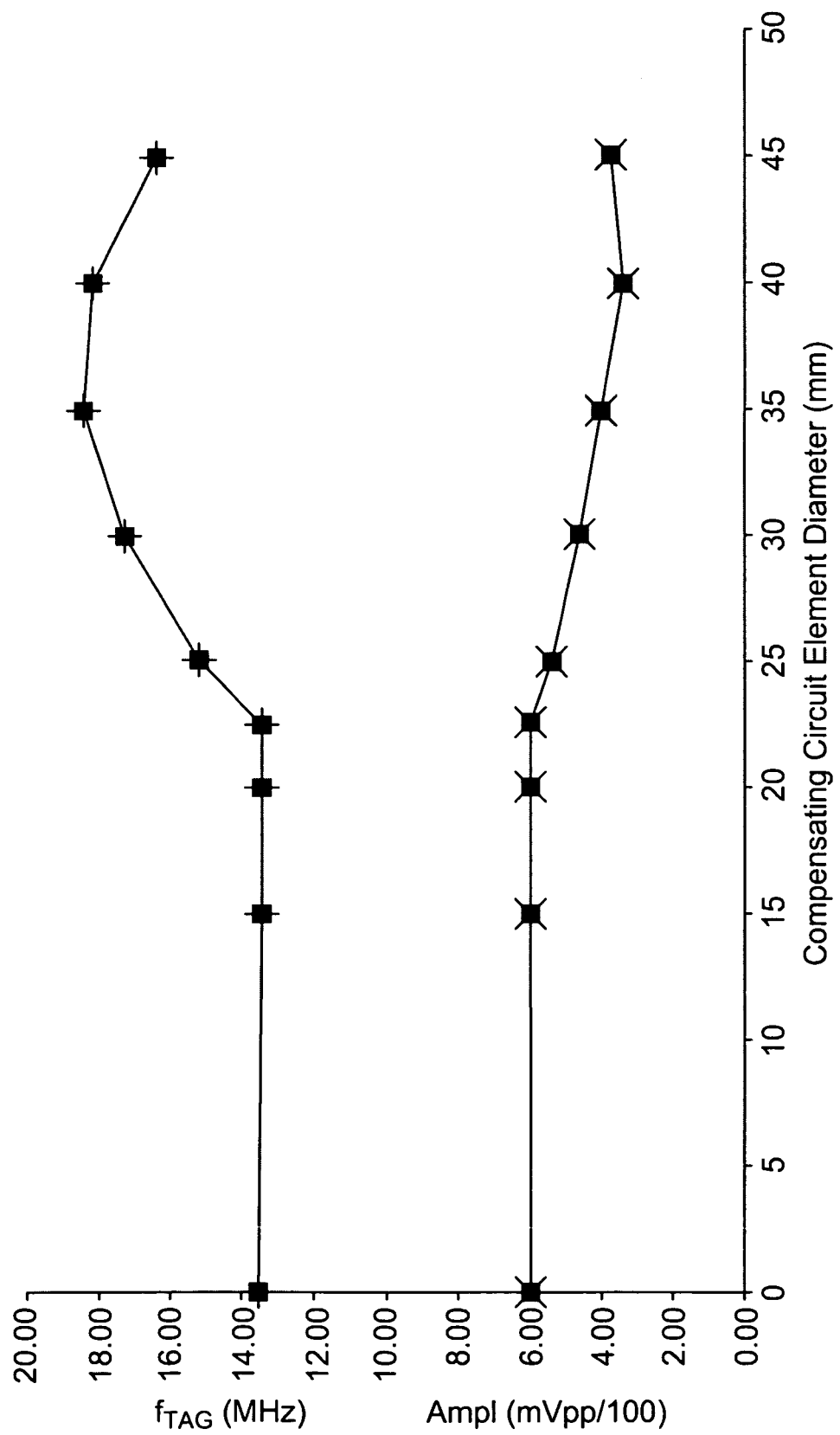
FIG. 15A is a graph showing resonant frequency of a rectilinear compensated RFID tag versus size of the compensating element.

FIG. 15A shows a graph of the frequency and amplitude response of a compensated RFID tag 20 vs. size of the compensating element 30. The results were taken from a standard, uncompensated RFID tag modified to include rectilinear compensating elements 30 of varying size. The diameter of the innermost loop of the RFID tag under test was approximately 25 mm, and the diameter of the outermost loop was approximately 45 mm. As shown in FIG. 15A, for compensating element 30 diameters of less than 22.5 mm, the compensating element 30 had no effect on the response of the RFID tag under test. However, once the diameter of the compensating element 30 became close to the diameter of the innermost loop of the tag under test, a measurable effect can be seen. Namely, the frequency response is shifted upwards, with a maximum when the diameter of the compensating element 30 approaches 40 mm.

Figure 15B:
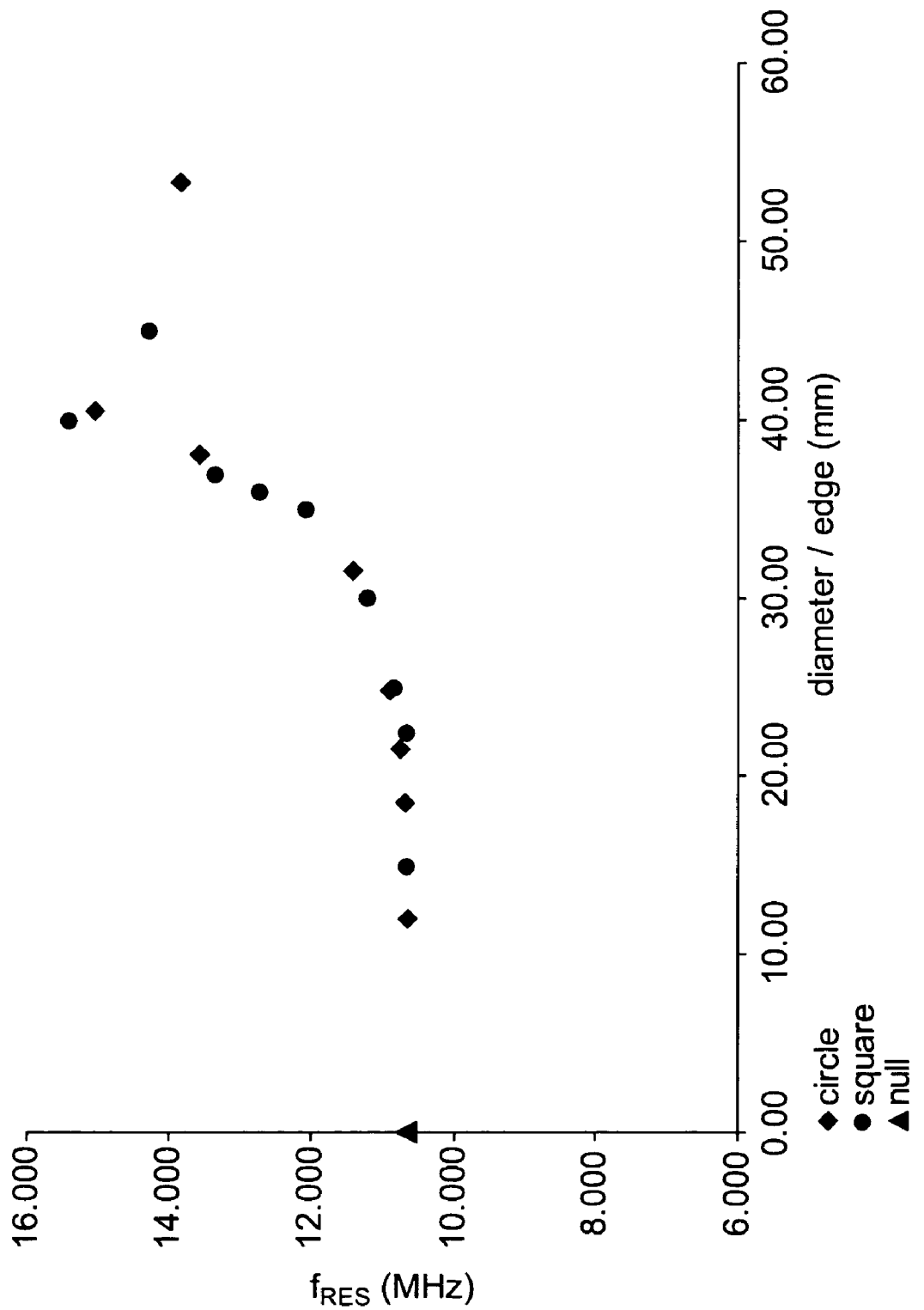
FIG. 15B is a graph showing resonant frequency of a rectilinear compensated RFID tag versus size of the compensating element, and of a circular compensated RFID tag versus size of the compensating element.

FIG. 15B shows a graph of the frequency and amplitude response of a compensated RFID tag 20 vs. size for a circular compensating element 30. Results for similarly sized rectilinear compensating elements 30 are also shown. As with the rectilinear compensating element, once the diameter of the compensating element becomes close to the diameter of the innermost loop of the tag under test, a measurable effect can be seen. Again, the frequency response is shifted upwards, with a maximum when the diameter of the circular compensating element and also the square compensating element is about 40 mm. From FIGS. 15A and 15B we can infer that the compensating element 30 may take virtually any shape and still perform the compensating function described herein.

FIGS. 15A and 15B also indicate that the effect of the compensating element 30 is a proximity coupled effect. That is, the compensating element 30 is proximity coupled to the RFID tag antenna 24. The compensating element 30 carries a coupled parasitic current driven by the current in the RFID tag antenna 24. The compensating element 30 is thus electromagnetically coupled to the RFID tag antenna 24 as opposed to the interrogating magnetic field generated by the RFID reader antenna. To produce this proximity coupled effect, the compensating element 30 can be positioned for electromagnetic coupling to the RFID tag antenna, i.e., such that a primary current in the antenna 24 induces a parasitic current in the compensating element 30. The compensating element 30 can be placed within 10 conductor line widths of at least one loop of antenna 24 to be positioned for electromagnetic coupling to the RFID tag antenna 24 to produce the proximity coupled effect. The term "conductor line width" refers to the line width of the proximity coupled loop or loops of antenna 24. Stronger proximity coupling is achieved when the compensating element 30 is positioned relatively closer to at least one loop of antenna 24, such as when the compensating element 30 is placed within 1-2 conductor line widths of at least one loop of antenna 24. However, it shall be understood that, as long as the compensating element 30 and the antenna 24 are positioned for electromagnetic coupling, the precise distance at which they are spaced is not a limiting factor for purposes of the present invention.

Figure 16:
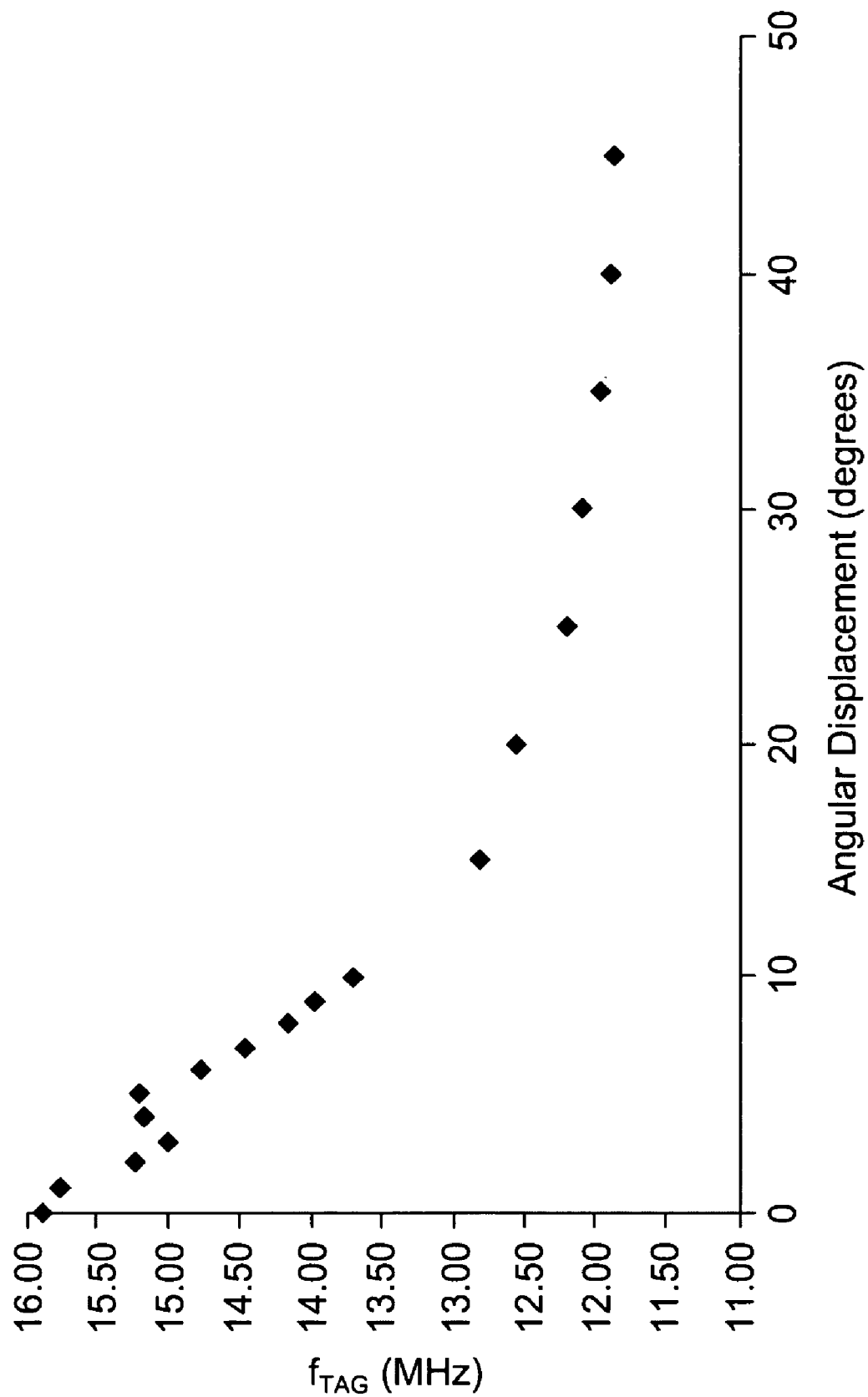
FIG. 16 is a graph showing resonant frequency of a compensated RFID tag versus angular displacement of the compensating element.

FIG. 16 shows the effect of angular displacement for a substantially rectilinear compensating element 30 with respect to the axis of a substantially rectilinear antenna 24. The compensating element was chosen to have an edge length approximately equal to the average edge length of the multiple loops of the RFID tag antenna. As shown, the proximity coupling effect is greatest at an angular displacement, or offset angle, (see FIGS. 6 and 7) of 0 degrees. As the angular displacement increases, the proximity coupling effect decreases nonlinearly until an angular displacement of approximately 10 degrees is reached. For angular displacements beyond 10 degrees, the proximity coupling effect decreases slowly for angular displacements up to 45 degrees.

FIG. 16 demonstrates that the proximity coupled effect on $f_{TAG}$ is greatest at an angular displacement of 0 degrees, and then falls off as the angular displacement is increased up to approximately 10 degrees. For angular displacements of greater than 10 degrees, any additional change in angular displacement has less effect on the RFID tag response. This means that, for those applications where compensating elements 30 are attached to conventional, uncompensated RFID tags, a more stable, predictable result may be achieved if compensating elements 30 are attached to the uncompensated RFID tags at an angle, rather than "square" with the loops of antenna 24. It shall be understood that although FIG. 16 was measured with respect to substantially square compensating element and RFID antenna 24, similar results would be obtained for other non-rotationally independent shapes. For rotationally independent shapes (e.g., a circle) the angular displacement should have no effect.

Figure 17:
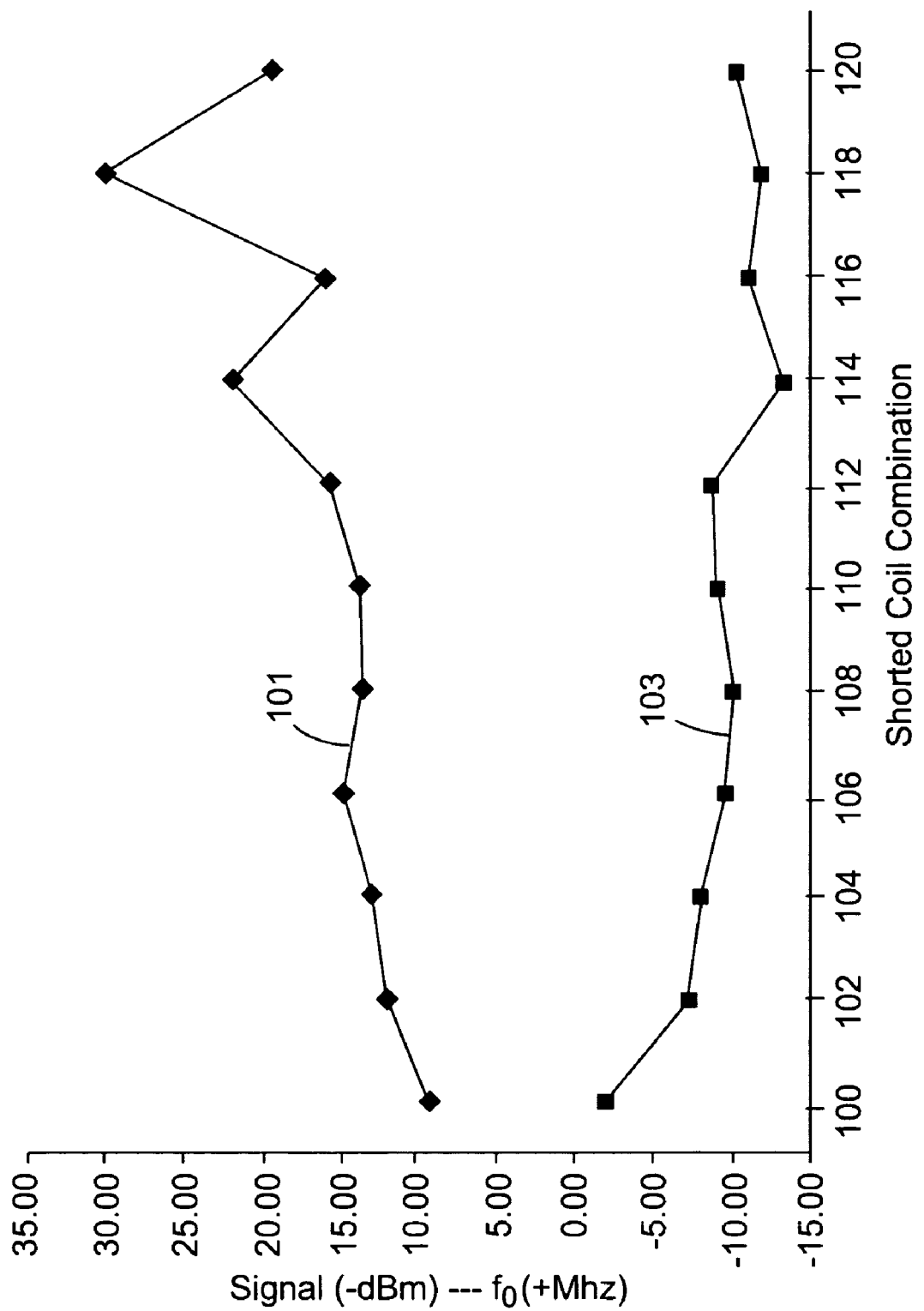
FIG. 17 is a graph showing resonant frequency and amplitude versus various shorted coil combinations in a compensated RFID tag.

Additional embodiments of compensated RFID tags 20 and compensating elements 30 will now be described with respect to FIG. 17. FIG. 17 shows the frequency response $f_{TAG}$ 101 and amplitude 103 of compensated RFID tags with differing compensating element 30 configurations. The compensated RFID tags of FIG. 17 are varying combinations of "shorted" coils or loops of the antenna 24. That is, different combinations of loops, or coils, in the antenna 24 were electrically connected, or shorted, to other loops of the antenna 24. In this manner, the compensating elements 30 whose response is shown in FIG. 17 are similar to those shown and described above with respect to FIG. 3, in that they are electrically connected to the RFID tag antenna, but they are not part of the direct electrical path (circuit) traced from the inner end of the RFID tag antenna to the outer end. In other words, although the compensating elements 30 whose responses are shown in FIG. 17 are electrically connected to the RFID tag antenna, they do not form a part of the RFID tag antenna itself. The coils of the antenna are numbered from 1 (the innermost loop or coil) to 9 (the outermost loop or coil). The configurations of shorted coils and the associated responses are indicated on FIG. 17 as follows:

| Ref. numeral | coils shorted |
|---|---|
| 100 | none |
| 102 | coil 1 to 2 |
| 104 | coil 2 to 3 |
| 106 | coil 4 to 5 |
| 108 | coil 8 to 9 |
| 110 | coils 1 and 2 to 3 |
| 112 | coil 2 and 3 to 4 |
| 114 | coil 3 to 4, coil 7 to 8 |
| 116 | coil 7 and 8 to 9 |
| 118 | coil 1 to 2, coil 3 to 4, coil 5 to 6, coil 7 to 8 |
| 120 | coils 1, 2, 3 and 4 to 5 |

From FIG. 17 several generalizations can be made. For example, shorting any one of the antenna loops to another antenna loop, from the innermost to the outermost, produces a compensating element effect. Also, shorting multiple coils, either to adjacent coils or to non-adjacent coils, also produces a compensating element effect. FIG. 17 indicates that many possible combinations of shorted coils exist which can perform the compensation function. It shall be understood, therefore, that these and other combinations of shorted coils as compensating elements are within the scope of the present invention.

Two different types of compensating elements 30 have thus been described. One type is that described with respect to FIGS. 2-6, in which the compensating element 30 is formed as physically separate from the RFID antenna 24. This physically separate, compensating element 30 can be electrically connected or electrically isolated (i.e., not connected) to the RFID) antenna 24. Another type is like that described above with respect to FIG. 17, in which physical coils, or loops, of the antenna 24 itself are shorted to other coils or loops of the antenna 24 to form a compensating element 30. Each coil or loop fonning a continuous loop compensating element 30 is connected at a single point of electrical contact with a coil or loop of the antenna 24. The selection of the type of compensating element 30, namely, whether formed as a physically separate element or formed as part of the RFID tag antenna itself, may depend upon the specific application for which the RFID tags are to be used, the desired resonant frequency of the compensated RFID tags, the manufacturing techniques used to produce the RFID tags, and whether the compensating element 30 is to be built into the RFID tag at manufacture or added onto pre-existing, uncompensated RFID tags in the manner discussed above with respect to FIG. 10.

Figure 18:
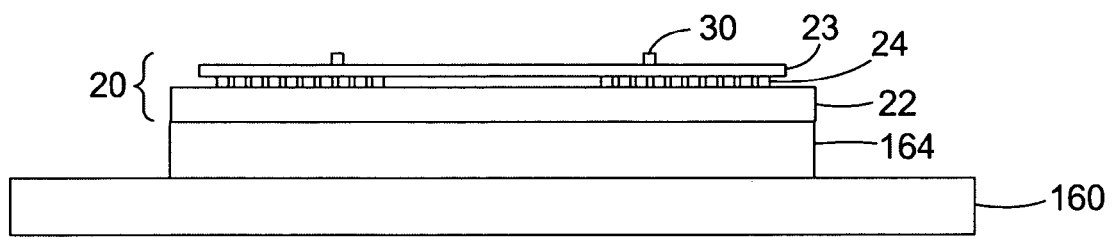
FIG. 18 is a diagram showing a RFID tag with a compensating element on a conductive substrate.

FIG. 18 shows another application for compensated RFID tags 20. FIG. 18 is a diagram showing a compensated RFID tag 20 on a conductive substrate 160. The compensated RFID tag 20 comprises a substrate 22, antenna 24, an optional RFID die (not shown), a compensating element substrate 23, and compensating element 30. A dielectric spacer 164 provides physical and electromagnetic separation between the compensated RFID tag 20 and the conductive surface 160 to be tagged. Again, for ease of illustration, the compensating element 30 is shown located entirely within innermost loop 24A of antenna 24. It shall be understood that the compensating element 30 may take any one of several possible forms, including any one of those shown and described above with respect to FIGS. 2-12.

Compensated RFID tags 20 can be used for the tagging or labeling of articles having metal and other conductive surfaces. Compensated RFID tags 20 show improved performance compared to standard, uncompensated RFID tags when the RFID tags are attached to metal or other conductive surfaces and detected by a magnetic-induction-coupled RFID system.

The read range, i.e., the distance at which an RFID reader can detect and communicate with an RFID tag, can be used as a quantifiable measure of RFID tag efficacy. In the presence of a conductive surface 160, a compensated RFID tag 20 on a dielectric spacer 164 shows greater read range than an equivalent conventional, uncompensated RFID tag mounted on a similar dielectric spacer on a similar conductive surface.

When labeling conductive surfaces, the effects of an electrical "image current" distribution formed in the conductive plane in response to the current distribution in an RFID tag should be taken into account. When an RFID tag and the conductive plane are in close proximity, the image current effectively negates the current distribution in the RFID tag. The effect of the tag plus image current can reduce the apparent tag response to the RFID reader, which the reader may interpret as "no tag" present.

The dielectric spacer 164 separates the electrical currents in an RFID tag from the induced image currents in the conductive surface. The effective electrical thickness (the product of the physical thickness, t, and the dielectric constant, $\epsilon$) of the dielectric spacer 164 may be increased either by increasing the actual physical thickness, t, or by increasing the dielectric constant $\epsilon$. For applications where the RFID tag is to be used as a label, a thick dielectric spacer may make the RFID tag too thick to be a practical solution for marking articles. For the compensated RFID tag on a conductive surface, a dielectric spacer can be made from a dielectric material with a moderately low $\epsilon$, such as $\epsilon<10$ in one embodiment, or $\epsilon<3$ in another embodiment, for example. Examples of such materials include foamed polymeric films, or hollow air-filled glass or polymer bubbles in a low-$\epsilon$ matrix such as polyethylene or polytetrafluoroethylene (PTFE), for example. The thickness of the dielectric spacer 164 should be sufficient to achieve the desired read range for the compensated RFID tag 20 on the conductive surface 160. For example, a dialectric spacer having a thickness t<10 mm, or having a thickness t<5 mm. Overall, the compensated RFID tag 20 permits use of a thinner dielectric spacer 164 so that the RFID label is less obtrusive.

The compensated RFID tags 20 result in improved efficacy of the read function of the compensated RFID tag on conductive surfaces. First, the compensated RFID tag provides longer read range in the presence of a conductive surface for electrically thin dielectric spacers. The compensated RFID tag on a conductive surface also provides equivalent read range in a physically thinner construction. In addition, the compensated RFID tag on a conductive surface offers equivalent performance in a smaller tag, compared to a conventional, uncompensated RFID tag.

Various embodiments of the invention have been described. These and other embodiments are within the scope of the following claims.

The invention claimed is:

1. A compensating element comprising a closed loop of conductive material having a size and proximity to an inductive loop antenna of an RFID tag for electromagnetic coupling to the inductive loop antenna to substantially maintain an operating frequency of the inductive loop antenna at or near an operating frequency of an RFID system in the presence of other RFID tags.

2. The compensating element of claim 1, wherein a parasitic current is induced in the compensating element in response to the electromagnetic coupling to the inductive loop antenna.

3. The compensating element of claim 1 wherein the conductive material comprises one of a die cut metal foil, a patterned metal foil, an electroplated conductive metal, a printed conductive ink, and a printed precursor material reduced to a conductive state.

4. The compensating element of claim 1 having a substantially rectilinear shape.

5. The compensating element of claim 1 having a substantially circular shape.

6. The compensating element of claim 1 further comprising a substrate upon which the closed loop is disposed.

7. The compensating element of claim 6 further comprising an adhesive layer disposed on one side of the substrate.

8. The compensating element of claim 7 wherein the compensating element and the adhesive layer are disposed on the same side of the substrate.

9. The compensating element of claim 7 wherein the compensating element and the adhesive layer are disposed on opposite sides of the substrate.

10. A radio frequency identification (RFID) tag, comprising:
an inductive loop antenna; and
a comnpensatixig element sized and positioned on the RFID tag proximate the inductive loop antenna for electromagnetic coupling to the inductive loop antenna to substantially maintain an operating frequency of the inductive loop antenna at or near an operating frequency of an RFID system in the presence of other RFID tags.

11. The RFID tag of claim 10, wherein a parasitic current is induced in the compensating element by a primary current in the inductive loop antenna.

12. The RFID tag of claim 10 wherein the compensating element is positioned for electromagnetic coupling to the inductive loop antenna such that an RFID system interrogating antenna is able to detect the compensated RFID tag when in close proximity to other RFID tags.

13. The RFID tag of claim 10, further including a RFID die having identification information stored therein.

14. The RFID tag of claim 10 wherein the compensating element comprises a closed loop of conductive material.

15. The RFID tag of claim 14 wherein the closed loop has a substantially rectilinear shape.

16. The RFID tag of claim 14 wherein the closed loop has a substantially circular shape.

17. The RFID tag of claim 14 wherein the closed loop is electrically isolated from the inductive loop antenna.

18. The RFID tag of claim 14 wherein the closed loop is electrically connected to the inductive loop antenna.

19. The RFID tag of claim 14 wherein the closed loop is disposed within an innermost loop of the inductive loop antenna.

20. The RFID tag of claim 14 wherein the closed loop is disposed between loops of the inductive loop antenna.

21. The RFID tag of claim 14 wherein the closed loop is disposed outside an outermost loop of the inductive loop antenna.

22. The RFID tag of claim 14 wherein the compensating element has an angular displacement of between 0 and 45 degrees with respect to an axis of the inductive loop antenna.

23. The RFID tag of claim 14 wherein the conductive material comprises one of a die cut metal foil, a patterned metal foil, an electroplated conductive metal, a printed conductive ink, and a printed precursor material reduced to a conductive state.

24. The RFID tag of claim 14 wherein the closed loop is disposed within 10 line widths of at least one loop of the inductive loop antenna.

25. The RFID tag of claim 14 wherein the closed loop is disposed within 2 line widths of at least one loop of the inductive loop antenna.

26. The RFID tag of claim 10 wherein the compensating element has an axis that is substantially aligned with an axis of the inductive loop antenna.

27. The RFID tag of claim 10 wherein the compensating element lies substantially in a plane parallel and proximate to a plane of the inductive loop antenna.

28. The RFID tag of claim 10 wherein the compensating element is substantially coplanar with the inductive loop antenna.

29. The RFID tag of claim 10 wherein the RFID tag resonates at a frequency of approximately 13.56±1.0 MHz.

30. The RFID tag of claim 10 wherein the compensating element is physically separate from the inductive loop antenna.

31. The RFID tag of claim 10 wherein the compensating element comprises at least one loop of the inductive loop antenna electrically connected to at least one other loop of the inductive loop antenna.

32. A radio frequency identification (RFID) tag, comprising:
an inductive loop antenna; and
a compensating element positioned for electromagnetic coupling to the inductive loop antenna,
wherein the compensating element comprises at least one loop of the inductive loop antenna electrically connected to at least one other loop of the inductive loop antenna,
wherein the compensating element comprises at least two loops of the inductive loop antenna, and wherein each of the two loops of the inductive loop antenna is electrically connected to a different one other loop of the inductive loop antenna.

33. The RFID tag of claim 32 wherein the at least two loops of the inductive loop antenna electrically connected to at least one other loop of the inductive loop antenna are adjacent loops.

34. The RFID tag of claim 32 wherein the at least two loops of the inductive loop antenna electrically connected to at least one other loop of the inductive loop antenna are non-adjacent loops.

35. A radio frequency identification (RFID) tag, comprising:
an inductive loop antenna; and
a compensating element positioned for electromagnetic coupling to the inductive loop antenna,
wherein the compensating element comprises at least one loop of the inductive loop antenna electrically connected to at least one other loop of the inductive loop antenna, and
wherein the at least one loop of the inductive loop antenna is electrically shorted to the at least one other loop of the inductive loop antenna.

36. A Radio Frequency Identification (RFID) tag for placement on a conductive surface, comprising:
a substrate;
an inductive loop antenna positioned on the substrate;
a compensating element sized and positioned on the RFID tag proximate the inductive loop antenna for electromagnetic coupling to the inductive loop antenna to substantially maintain an operating frequency of the inductive loop antenna at or near an operating frequency of an RFID system in the presence of other RFID tags; and
a dielectric spacer positioned between the substrate and the conductive surface.

37. The RFID tag of claim 36 wherein the dielectric spacer has a dielectric constant less than 10.

38. The RFID tag of claim 37 wherein the dielectric spacer has a dielectric constant less than 3.

39. The RFID tag of claim 36 wherein the dielectric spacer has a thickness of less than 10 mm.

40. The RFID tag of claim 36 wherein the dielectric spacer has a thickness of less than 5 mm.

41. The RFID tag of claim 10, wherein the inductive loop antenna is a multi-turn inductive loop antenna.

42. The RFID tag of claim 10, wherein the operating frequency of the inductive loop antenna is inversely proportional to a distance between the compensating element and the inductive loop antenna.

43. The RFID tag of claim 10, wherein the inductive loop antenna is electromagnetically coupled to an interrogating magnetic field generated by an RFID reader, and wherein the compensating element is not electromagnetically coupled to the interrogating magnetic field generated by the RFID reader.

44. The RFID tag of claim 24, wherein the RFID tag resonates at a frequency of approximately 13.56±1.0 MHz.

45. A method comprising:
 selecting a size for a compensating element;
 forming the compensating element according to the selected size; and
 positioning the compensating element on an RFID tag proximate an inductive loop antenna so as to provide electromagnetic coupling by the compensating element to the inductive loop antenna to substantially maintain an operating frequency of the inductive loop antenna at or near an operating frequency of an RFID system in the presence of other RFID tags.

46. The method of claim 45, wherein the conductive loop antenna is a multi-turn antenna, and wherein positioning the compensating element comprises positioning the compensating element interspersed with loops of the inductive loop antenna.

47. The method of claim 45, further comprising electrically connecting the compensating element to antenna via a conductive jumper connecting an innermost loop of the inductive loop antenna to a point on a perimeter of the compensating element.

48. The method of claim 45,
 wherein selecting the size of the compensating element comprises selecting a diameter of the compensating element based on a diameter of the inductive loop antenna, and
 wherein a frequency response of the inductive loop antenna is greater when the diameter of the compensating element is sized within a range bounded by a diameter of an innermost loop of the inductive loop antenna and a diameter of an outermost loop of the inductive loop antenna than when the diameter of the compensating element is not sized within the range.

* * * * *

UNITED STATES PATENT AND TRADEMARK OFFICE
CERTIFICATE OF CORRECTION

PATENT NO.         : 7,268,687 B2
APPLICATION NO. : 10/807072
DATED                  : September 11, 2007
INVENTOR(S)       : William C. Egbert et al.

It is certified that error appears in the above-identified patent and that said Letters Patent is hereby corrected as shown below:

Column 1,
Line 55, delete "(REID)" and insert -- (REID) --.
Line 57, delete "REID" and insert -- RFID --.
Line 58, delete "REID" and insert -- RFID --.
Line 60, delete "RED" and insert -- RFID --.
Line 60, delete "REID" and insert -- RFID --.
Line 61, delete "RED" and insert -- RFID --.
Line 62, delete "REID" and insert -- RFID --.

Column 3,
Line 37, after "areas" insert -- . --.

Column 4,
Line 15, delete "REID" and insert -- RFID --.
Line 17, delete "REID" and insert -- RFID --.
Line 19, delete "MediCal" and insert -- Medical --.
Lines 21 and 22, delete "frequencies may be wed for REID applicatioDs," and insert -- frequencies may be used for RFID applications, --.
Line 23, delete "REID" and insert -- RFID --.

Column 5,
Line 19, after "reader" delete "," and insert -- 18 --.
Line 41, delete "tat" and insert -- that --.
Line 42, delete "arc" and insert -- are --.
Line 44, delete "RFID)" and insert -- RFID --.
Line 49, delete "tags," and insert -- tag --.

Column 13,
Line 15, delete "RFID)" and insert -- RFID --.
Line 19, delete "foning" and insert -- forming --.

Column 14,
Line 22, delete "dialectric" and insert -- dielectric --.

Column 15,
Line 7, delete "comnpensatixig" and insert -- compensating --.

UNITED STATES PATENT AND TRADEMARK OFFICE
CERTIFICATE OF CORRECTION

PATENT NO. : 7,268,687 B2
APPLICATION NO. : 10/807072
DATED : September 11, 2007
INVENTOR(S) : William C. Egbert et al.

It is certified that error appears in the above-identified patent and that said Letters Patent is hereby corrected as shown below:

Column 16,
Line 64, delete "36" and insert -- 39 --.

Signed and Sealed this

Twentieth Day of November, 2007

JON W. DUDAS
*Director of the United States Patent and Trademark Office*